US007568168B2

(12) United States Patent
Beezer et al.

(10) Patent No.: US 7,568,168 B2
(45) Date of Patent: *Jul. 28, 2009

(54) METHOD AND APPARATUS FOR CAPTURING AND RENDERING TEXT ANNOTATIONS FOR NON-MODIFIABLE ELECTRONIC CONTENT

(75) Inventors: John L. Beezer, Redmond, WA (US); Marco A. DeMello, Redmond, WA (US); David M. Silver, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 778 days.

This patent is subject to a terminal disclaimer.

(21) Appl. No.: 11/224,936

(22) Filed: Sep. 14, 2005

(65) Prior Publication Data

US 2006/0010396 A1 Jan. 12, 2006

Related U.S. Application Data

(63) Continuation of application No. 09/455,807, filed on Dec. 7, 1999, now Pat. No. 7,028,267.

(51) Int. Cl.
*G06F 17/21* (2006.01)
(52) U.S. Cl. ...................... 715/802; 715/854
(58) Field of Classification Search ................ 715/230, 715/231, 232, 233, 800, 802, 804, 805, 767, 715/744, 745, 747, 789
See application file for complete search history.

(56) References Cited

U.S. PATENT DOCUMENTS

| 5,146,552 A | 9/1992 | Cassorla et al. |
| 5,237,648 A | 8/1993 | Mills et al. |
| 5,239,466 A | 8/1993 | Morgan et al. |
| RE34,476 E | 12/1993 | Norwood |
| 5,347,295 A | 9/1994 | Agulnick et al. |
| 5,434,929 A | 7/1995 | Beernink et al. |
| 5,434,965 A | 7/1995 | Matheny |
| 5,471,568 A | 11/1995 | Webb et al. |
| 5,559,942 A | 9/1996 | Gough et al. |
| 5,572,643 A | 11/1996 | Judson |
| 5,623,679 A | 4/1997 | Rivette et al. |

(Continued)

FOREIGN PATENT DOCUMENTS

EP  0 342 838 A  11/1989

(Continued)

OTHER PUBLICATIONS

Schilit et al., "Digital Library Information Appliances", pp. 217-225, 1998.

(Continued)

*Primary Examiner*—Steven P Sax

(57) ABSTRACT

A system and method for capturing, displaying, and navigating text annotations in a non-modifiable document is disclosed. Once it is determined that a text annotation is to be created, the system determines the file position of the selected object. The file position of the selected object is stored along with the created text annotation in another file or a non-read only portion of a file storing the document. Using the file position, the text annotation may be properly identified with the selected object without modifying the non-modifiable document. Once a text annotation is displayed a user may easily navigate among the captured annotations.

24 Claims, 9 Drawing Sheets

U.S. PATENT DOCUMENTS

| | | | |
|---|---|---|---|
| 5,625,833 A | 4/1997 | Levine et al. | |
| 5,630,125 A | 5/1997 | Zellweger | |
| 5,632,022 A | 5/1997 | Warren et al. | |
| 5,666,113 A | 9/1997 | Logan | |
| 5,680,636 A | 10/1997 | Levine et al. | |
| 5,682,439 A | 10/1997 | Beernink et al. | |
| 5,687,331 A | 11/1997 | Volk et al. | |
| 5,689,717 A | 11/1997 | Pritt | |
| 5,717,860 A | 2/1998 | Graber et al. | |
| 5,717,879 A | 2/1998 | Moran | |
| 5,719,595 A | 2/1998 | Hoddie et al. | |
| 5,727,129 A | 3/1998 | Barrett et al. | |
| 5,729,687 A | 3/1998 | Rothrock et al. | |
| 5,737,599 A | 4/1998 | Rowe et al. | |
| 5,745,116 A | 4/1998 | Pisutha-Arnond | |
| 5,760,773 A | 6/1998 | Berman et al. | |
| 5,761,683 A | 6/1998 | Logan et al. | |
| 5,786,814 A | 7/1998 | Moran et al. | |
| 5,790,818 A | 8/1998 | Martin | |
| 5,799,318 A | 8/1998 | Cardinal et al. | |
| 5,801,687 A | 9/1998 | Peterson et al. | |
| 5,802,516 A | 9/1998 | Shwarts et al. | |
| 5,819,301 A | 10/1998 | Rowe et al. | |
| 5,821,925 A | 10/1998 | Carey et al. | |
| 5,822,720 A | 10/1998 | Bookman et al. | |
| 5,832,263 A | 11/1998 | Hansen et al. | |
| 5,835,092 A | 11/1998 | Boudreau et al. | |
| 5,838,313 A | 11/1998 | Hou et al. | |
| 5,838,914 A | 11/1998 | Carleton et al. | |
| 5,845,262 A | 12/1998 | Nozue et al. | |
| 5,854,630 A | 12/1998 | Nielsen | |
| 5,860,074 A | 1/1999 | Rowe et al. | |
| 5,862,395 A | 1/1999 | Bier | |
| 5,877,757 A | 3/1999 | Baldwin et al. | |
| 5,893,126 A | 4/1999 | Drews et al. | |
| 5,893,132 A | 4/1999 | Huffman et al. | |
| 5,918,236 A | 6/1999 | Wical | |
| 5,920,694 A | 7/1999 | Carleton et al. | |
| 5,923,326 A | 7/1999 | Bittinger et al. | |
| 5,924,104 A | 7/1999 | Earl | |
| 5,931,912 A | 8/1999 | Wu et al. | |
| 5,933,139 A | 8/1999 | Feigner et al. | |
| 5,933,140 A | 8/1999 | Strahorn et al. | |
| 5,937,416 A | 8/1999 | Menzel | |
| 5,940,080 A | 8/1999 | Ruehle et al. | |
| 5,948,040 A | 9/1999 | DeLorme et al. | |
| 5,950,214 A | 9/1999 | Rivette et al. | |
| 5,956,034 A | 9/1999 | Sachs et al. | |
| 5,956,048 A | 9/1999 | Gaston | |
| 5,978,818 A | 11/1999 | Lin | |
| 5,983,248 A | 11/1999 | DeRose et al. | |
| 5,986,665 A | 11/1999 | Wrey et al. | |
| 6,011,537 A | 1/2000 | Slotznick | |
| 6,012,055 A | 1/2000 | Campbell et al. | |
| 6,018,334 A | 1/2000 | Eckerberg et al. | |
| 6,018,342 A | 1/2000 | Bristor | |
| 6,018,344 A | 1/2000 | Harada et al. | |
| 6,018,742 A | 1/2000 | Herbert, III | |
| 6,025,841 A | 2/2000 | Finkelstein et al. | |
| 6,034,689 A | 3/2000 | White et al. | |
| 6,035,330 A | 3/2000 | Astiz et al. | |
| 6,037,934 A | 3/2000 | Himmel et al. | |
| 6,038,598 A | 3/2000 | Danneels | |
| 6,049,812 A | 4/2000 | Bertram et al. | |
| 6,052,514 A | 4/2000 | Gill et al. | |
| 6,054,990 A | 4/2000 | Tran | |
| 6,064,384 A | 5/2000 | Ho | |
| 6,072,490 A | 6/2000 | Bates et al. | |
| 6,076,917 A | 6/2000 | Wen | |
| 6,081,829 A | 6/2000 | Sidana | |
| 6,091,930 A | 7/2000 | Mortimer et al. | |
| 6,094,197 A | 7/2000 | Buxton et al. | |
| 6,105,044 A | 8/2000 | DeRose et al. | |
| 6,122,649 A | 9/2000 | Kanerva et al. | |
| 6,133,925 A | 10/2000 | Jaremko et al. | |
| 6,141,007 A | 10/2000 | Lebling et al. | |
| 6,144,991 A | 11/2000 | England | |
| 6,151,622 A | 11/2000 | Fraenkel et al. | |
| 6,154,771 A | 11/2000 | Rangan et al. | |
| 6,157,381 A | 12/2000 | Bates et al. | |
| 6,163,778 A | 12/2000 | Fogg et al. | |
| 6,181,344 B1 | 1/2001 | Tarpenning et al. | |
| 6,184,886 B1 | 2/2001 | Bates et al. | |
| 6,195,679 B1 | 2/2001 | Bauersfeld et al. | |
| 6,195,694 B1 | 2/2001 | Chen et al. | |
| 6,199,082 B1 | 3/2001 | Ferrel et al. | |
| 6,205,419 B1 | 3/2001 | Fiedler | |
| 6,205,455 B1 | 3/2001 | Umen et al. | |
| 6,211,871 B1 | 4/2001 | Himmel et al. | |
| 6,226,655 B1 | 5/2001 | Borman et al. | |
| 6,230,171 B1 | 5/2001 | Pacifici et al. | |
| 6,243,071 B1 | 6/2001 | Shwarts et al. | |
| 6,243,091 B1 | 6/2001 | Berstis | |
| 6,266,772 B1 | 7/2001 | Suzuki | |
| 6,271,840 B1 | 8/2001 | Finseth et al. | |
| 6,272,484 B1 | 8/2001 | Martin et al. | |
| 6,279,005 B1 | 8/2001 | Zellweger | |
| 6,279,014 B1 | 8/2001 | Schilit et al. | |
| 6,289,126 B1 | 9/2001 | Ishisaka | |
| 6,289,362 B1 | 9/2001 | Van Der Meer | |
| 6,301,590 B1 | 10/2001 | Siow et al. | |
| 6,320,169 B1 | 11/2001 | Clothier | |
| 6,321,244 B1 | 11/2001 | Liu et al. | |
| 6,331,866 B1 | 12/2001 | Eisenberg | |
| 6,331,867 B1 | 12/2001 | Eberhard | |
| 6,340,980 B1 | 1/2002 | Ho | |
| 6,356,287 B1 | 3/2002 | Ruberry et al. | |
| 6,369,811 B1 | 4/2002 | Graham et al. | |
| 6,370,497 B1 | 4/2002 | Knowles | |
| 6,377,983 B1 | 4/2002 | Cohen et al. | |
| 6,389,434 B1 | 5/2002 | Rivette et al. | |
| 6,393,422 B1 | 5/2002 | Wone | |
| 6,397,264 B1 | 5/2002 | Stasnick et al. | |
| 6,405,221 B1 | 6/2002 | Levine et al. | |
| 6,421,065 B1 | 7/2002 | Walden et al. | |
| 6,425,525 B1 | 7/2002 | Swaminathan et al. | |
| 6,437,793 B1 | 8/2002 | Kaasila | |
| 6,437,807 B1 | 8/2002 | Berquist et al. | |
| 6,446,110 B1 | 9/2002 | Lection et al. | |
| 6,457,013 B1 | 9/2002 | Saxton et al. | |
| 6,460,058 B2 | 10/2002 | Koppolu et al. | |
| 6,484,156 B1 | 11/2002 | Gupta et al. | |
| 6,486,895 B1 | 11/2002 | Robertson et al. | |
| 6,490,603 B1 | 12/2002 | Keenan et al. | |
| 6,493,702 B1 | 12/2002 | Adar et al. | |
| 6,529,920 B1 | 3/2003 | Arons et al. | |
| 6,535,294 B1 | 3/2003 | Arledge et al. | |
| 6,539,370 B1 | 3/2003 | Chang et al. | |
| 6,549,220 B1 | 4/2003 | Hsu et al. | |
| 6,549,878 B1 | 4/2003 | Lowry et al. | |
| 6,560,621 B2 | 5/2003 | Barile | |
| 6,571,211 B1 | 5/2003 | Dwyer et al. | |
| 6,571,295 B1 | 5/2003 | Sidana | |
| 6,585,776 B1 | 7/2003 | Bates et al. | |
| 6,631,496 B1 | 10/2003 | Li et al. | |
| 6,647,534 B1 | 11/2003 | Graham et al. | |
| 6,662,310 B2 | 12/2003 | Lopez et al. | |
| 6,697,997 B1 | 2/2004 | Fujimura | |
| 6,760,884 B1 | 7/2004 | Vertelney et al. | |
| 6,772,139 B1 | 8/2004 | Smith | |
| 6,788,316 B1 | 9/2004 | Ma et al. | |
| 6,904,450 B1 | 6/2005 | King et al. | |
| 7,028,267 B1 * | 4/2006 | Beezer et al. | 715/802 |
| 7,203,910 B1 | 4/2007 | Hugh et al. | |

| | | | |
|---|---|---|---|
| 2001/0031128 | A1 | 10/2001 | Manbeck |
| 2002/0016786 | A1 | 2/2002 | Pitkow et al. |
| 2002/0097261 | A1 | 7/2002 | Gottfurcht et al. |
| 2002/0099552 | A1 | 7/2002 | Rubin et al. |
| 2005/0060138 | A1 | 3/2005 | Wang et al. |
| 2007/0255810 | A1 | 11/2007 | Shuster |

FOREIGN PATENT DOCUMENTS

| | | |
|---|---|---|
| EP | 0 822 501 A1 | 2/1998 |
| EP | 0 890 926 A1 | 1/1999 |
| EP | 0902379 A2 | 3/1999 |
| WO | WO 87/01481 | 3/1987 |
| WO | WO 96/20908 | 7/1996 |
| WO | WO 97/22109 | 6/1997 |
| WO | WO 98/06054 | 2/1998 |
| WO | WO 98/09446 | 3/1998 |
| WO | WO 99/49383 | 9/1999 |

OTHER PUBLICATIONS

Graefe et al., "Designing the muse: A Digital Music Stand for the Symphony Musician", pp. 436-440, CHI 96, Apr. 13-18, 1996.
"Adobe Acrobat 3.0 Reader Online Guide", Adobe Systems, Inc., 1996, pp. 1-110.
SoftBook.RTM. Press. The Leader In Internet-Enabled Document Distribution and Reading Systems; http://www.softbook.com/consumer/reader.asp.
Rocket eBook Using the Rocket eBook: http://www.rocketbook.com/Products/Faq/using.html.
Explore the Features of the Rocket eBook; wysiwyg//212http://www.rocketbook.com/Products.Tourindex.html.
Crespo, Chang, and Bier, "Responsive Interaction for a large Web application: the meteror shower architecture in the WebWriter II Editor", Computer Networks and ISON Systems, pp. 1508-1517.
Kunikazu, T., Patent Abstracts of Japan, Publication No. 11327789 for Color Display and Electronic Blackboard System, published Nov. 30, 1999.
Open eBook Forum. Open eBookTM Publication Structure 1.0, http://www.ebook.org/oebos/oebost.p/download/oeb1-oebps.htm.
Kristensen, A., "Formsheets and the XML Forms Language" (Mar. 1999).
Dublin Core Resource Types: Structurally Draft; Jul. 24, 1997, Feb. 27, 1998.
Dublin Core Meladate Element Set. Version 1.1:Reference Description 1999.
Dublin Core Metadate Initiative: User Guide Working Draft 1998- Jul. 31, 1999.
Hirotsu et al., "Cmew/U—A Multimedia Web Annotation Sharing System", NTT Network Innovation Laboratories—Japan, IEEE, 1999, pp. 356-359.
Kuo et al., "A Synchronization Scheme for Multimedia Annotation"Multimedia Information Networking Laboratory, Tamkang University—Taiwan, IEEE, 1997, pp. 594-598.
"Hucklefine Defined," Apr. 1990, http://www.ylem.org/artists/mmosher/huck.html, pp. 1-3.
"Tour of Korea Hypcercard Stack," 1996, Grose Educational Media, http://www.entrenet.com/~groedmed/kor2.html, pp. 1-2.
Bizweb2000.com—screenshots of an e-book, published on May 1999, pp. 1-4, http://web.archive.org/web/*/http://www.bizweb2000.com/eshots.htm.
PhotoImpact 3.0, Ulead Systems Inc., 1996.
Adobe Acrobat 3.0 Review, downloaded from <http://www.hmug.org/Reviews/>, reviewed Mar. 1997, pp. 1-18.
Landay et al., "Making Sharing Pervasive: Ubiquitous Computing for Shared Note Taking," IBM Systems Journal, vol. 38, No. 4, 1999, pp. 531-550.
Landay, J. A., "Using Note-Taking Appliances for Student to Student Collaboration," 29th Annual Frontiers in Education Conference, IEEE Computer Society, Nov. 1999, p. Session 12C4/15-12C4/20.
C. Marshall, "Annotation from paper books to the digital library," ACM International Conf. on Digital Libraries, 1997, pp. 131-140.
"Joke eBook," Jul. 1998, PrimaSoft PC, Inc., Electronic Book Series Version 1.0, pp. 1-5.
D. Munyan, "Everybook, Inc: Developing the E-Book in Relation to Publishing Standards." Sep. 1998, http://www.futureprint.kent.edu/articles/munyan0.1htm, pp. 1-7.

* cited by examiner

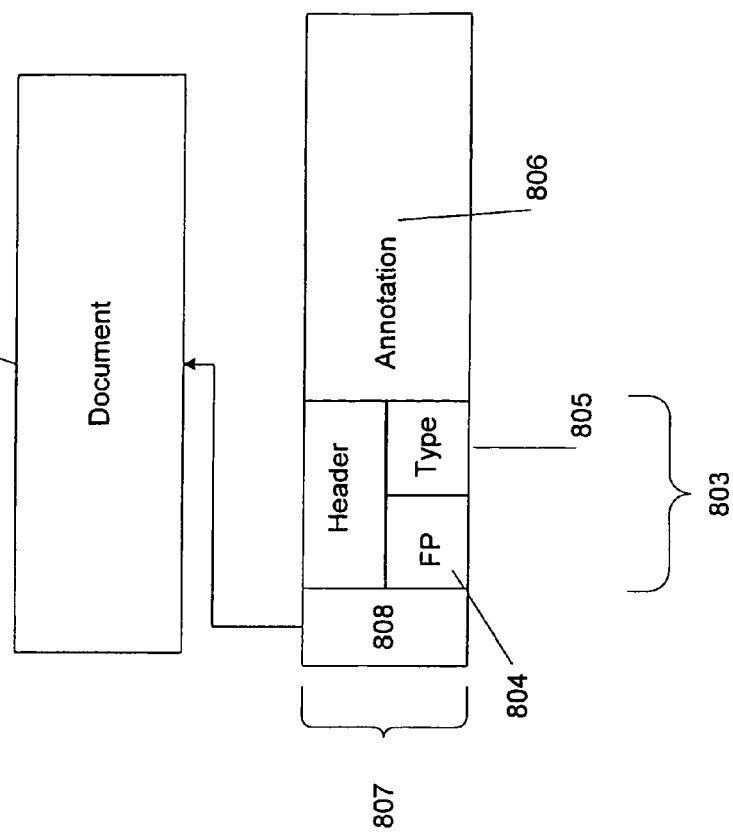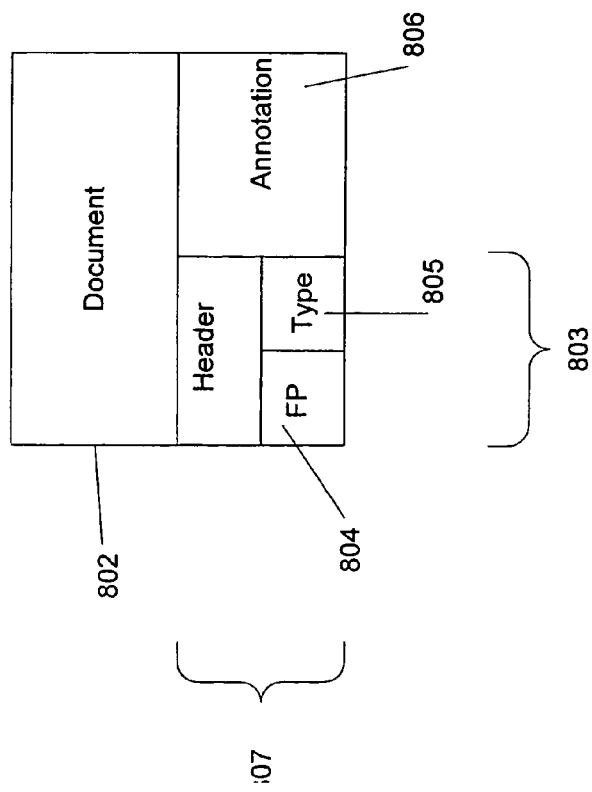

METHOD AND APPARATUS FOR CAPTURING AND RENDERING TEXT ANNOTATIONS FOR NON-MODIFIABLE ELECTRONIC CONTENT

1. RELATED APPLICATIONS

This application is a continuation application of U.S. Ser. No. 09/455,807, filed Dec. 7, 1999, and its entire contents are hereby incorporated by reference.

This application is related to the following applications:

U.S. Ser. No. 09/455,807, entitled "Method and Apparatus For Capturing and Rendering Text Annotations For Non-Modifiable Electronic Content;"

U.S. Ser. No. 09/456,127, filed Dec. 7, 1999, (BW 03797.80027), entitled "Bookmarking and Placemarking a Displayed Document in a Computer System;"

U.S. Ser. No. 09/455,754, filed Dec. 7, 1999, (BW 03797.84619), entitled "Method and Apparatus for Installing and Using Reference Materials In Conjunction With Reading Electronic Content;"

U.S. Ser. No. 09/455,805, (BW 03797.78802), filed Dec. 7, 1999, entitled "System and Method for Annotating an Electronic Document Independently of Its Content;"

U.S. Registration No. 6,714,214, Issued on Mar. 30, 2004, (BW 03797.84809), entitled "System, Method, and User Interface for Active Reading of Electronic Content;" and, U.S. Ser. No. 09/455,806, (BW 03797.84617), filed Dec. 7, 1999, entitled "Method and Apparatus For Capturing and Rendering Annotations For Non-Modifiable Electronic Content."

Each of these applications is hereby incorporated by reference in their entireties.

2. BACKGROUND

1. Technical Field

The disclosure generally relates to the electronic display of documents. More particularly, the disclosure relates to the placement and use of text annotations in electronically displayed documents.

2. Related Art

Many factors today drive the development of computers and computer software. One of these factors is the desire to provide accessibility to information virtually anytime and anywhere. The proliferation of notebook computers, personal digital assistants (PDAs), and other personal electronic devices reflect the fact that users want to be able to access information wherever they may be, whenever they want. In order to facilitate greater levels of information accessibility, the presentation of information must be made as familiar and comfortable as possible.

In this vein, one way to foster success of electronic presentations of information will be to allow users to handle information in a familiar manner. Stated another way, the use and manipulation of electronically-presented information may mimic those paradigms that users are most familiar with, e.g., printed documents, as an initial invitation to their use. As a result, greater familiarity between users and their "machines" will be engendered, thereby fostering greater accessibility, even if the machines have greater capabilities and provide more content to the user beyond the user's expectations. Once users feel comfortable with new electronic presentations, they will be more likely to take advantage of an entire spectrum of available functionality.

One manner of encouraging familiarity is to present information in an electronic book format in which a computer displays information in a manner that closely resembles printed books. In order to more completely mimic a printed book, users will need to have the ability to make textual notes to themselves, akin to writing in the margins of paper books. Users will also want to highlight selected portions, as these are active-reading activities of which a user would expect to see in an electronic book. Users will want to add drawings, arrows, underlining, strike-throughs, and the like, also akin to writing in paper books. Finally, users will want to add bookmarks.

The above-identified so-called "active-reading" activities are available in electronic document editors. However, all of these active-reading activities require modification of the underlying document through inserting the new text into the original document. This insertion corrupts the underlying document from its pre-insertion, pristine state. While this may not be an issue in an editable document, the modification of a copyrighted document may run afoul of various copyright provisions. The violations may be compounded with the forwarding of the document to another in its modified state. Further, irrespective of any copyright transgressions, publishing houses responsible for the distribution of the underlying text may not be pleased with any ability to modify their distributed and copyrighted works.

Thus, the users' desire to actively read and annotate works clashes with the goals of publishing houses to keep copyrighted works in their unmodified state. Without solution of this dilemma, the growth of the electronic publishing industry may be hampered, on one hand, by readers who refuse to purchase electronic books because of the inability to annotate read-only documents and, on the other hand, by the publishing industry that refuses to publish titles that allow for annotations that destroy the pristine compilation of the electronic works.

Further, while it has been possible to make textual notes in electronic documents, previous interfaces have been cumbersome to use. These interfaces often require a user to navigate through a number of options to open an interface to add textual notes. For example, to add text notes, one needs navigate to a menu bar zone, instantiate the menu bar by clicking on a menu icon, select the action the user wants to take (add text notes, for example), then navigate to the location where the text notes are to be inserted. This number of steps becomes increasingly tedious as the more the user tends to annotate displayed content. This increase in tedium may force the user away from reading and annotating content in electronic form.

3. SUMMARY

The present invention provides a technique for annotating an electronic document or electronic book without corruption of the document itself. In the context of the present invention, a "document" encompasses all forms of electronically displayable information including but not limited to books, manuals, reference materials, picture books, etc. To create an annotation, a user selects an object in the document to locate where the annotation is to be placed. The computer system determines which object has been selected and determines a file position associated with the selected object. The user adds the annotation and, eventually, returns to reading the document. Annotations may include, but are not limited to, highlighting, making textual notes, drawings, doodles, arrows, underlining, strike-throughs, and the like. The annotations may be filtered, navigated, sorted, and indexed per user input.

As described herein, the present invention includes an enhanced user interface that provides immediate gratification of being able to quickly add text annotations without having to navigate a complex interface. Also, the user interface provides for navigation between related annotations. In one embodiment, navigation functionality may be combined with the adding text functionality on the same displayed interface.

In the context of the present invention, a displayed "object" may include text, graphics, equations, and other related elements as contained in the displayed document. For the purpose of this disclosure, annotations are generally related to textual annotations. However, other annotations that may be used include highlighting, drawings (as one would expect to do with a pencil or pen to a paper book), and bookmarks. While the annotations are to be displayed in conjunction with the document, the underlying document is not modified. Related annotations are described in the following disclosures:

U.S. Ser. No. 09/456,127, filed Dec. 7, 1999, (BW 03797.80027), entitled "Bookmarking and Placemarking a Displayed Document in a Computer System;"

U.S. Ser. No. 09/455,754, filed Dec. 7, 1999, (BW 03797.84619), entitled "Method and Apparatus for Installing and Using Reference Materials In Conjunction With Reading Electronic Content;"

U.S. Ser. No. 09/455,805, (BW 03797.78802), filed Dec. 7, 1999, entitled "System and Method for Annotating an Electronic Document Independently of Its Content;"

U.S. Ser. No. 09/455,806, (BW 03797.84617), filed Dec. 7, 1999, entitled "Method and Apparatus For Capturing and Rendering Annotations For Non-Modifiable Electronic Content."

To associate an annotation with a selected object, the annotations are linked to a file position in the non-modifiable document. The invention calculates the file position of, for example, the first character of the word (or other displayed element) and stores the file position with the annotation in a separate, linked local file. Alternatively, the non-modifiable document may represent a non-modifiable portion of a file, with the annotations being added to a write-enabled portion of the file.

The determined file position may be used for direct random access into the non-modifiable document, despite the document being compressed or decompressed. In one embodiment, the file position is specified in a UTF-8 (a known textual storage format) document derived from an original Unicode (another known textual storage format) document. However, in order to conserve space, the non-modifiable document may be compressed using a general-purpose binary compression algorithm, decompressed, and translated to Unicode for viewing. Accordingly, the file position as stored for an annotation is consistent through various storage schemes and compression techniques.

These and other novel advantages, details, embodiments, features and objects of the present invention will be apparent to those skilled in the art from following the detailed description of the invention, the attached claims and accompanying drawings, listed herein, which are useful in explaining the invention.

4. BRIEF DESCRIPTION OF DRAWINGS

FIGS. 8A and 8B show various storage techniques for storing annotations in accordance with embodiments of the present invention.

5. DETAILED DESCRIPTION

The present invention relates to a system and method for capturing annotations associated with a non-modifiable document.

Although not required, the invention will be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCs), handheld devices, multiprocessor systems, microprocessor-based or programmable consumer electronics, network PCs, mini-computers, mainframe computers, and the like.

Figure 1:
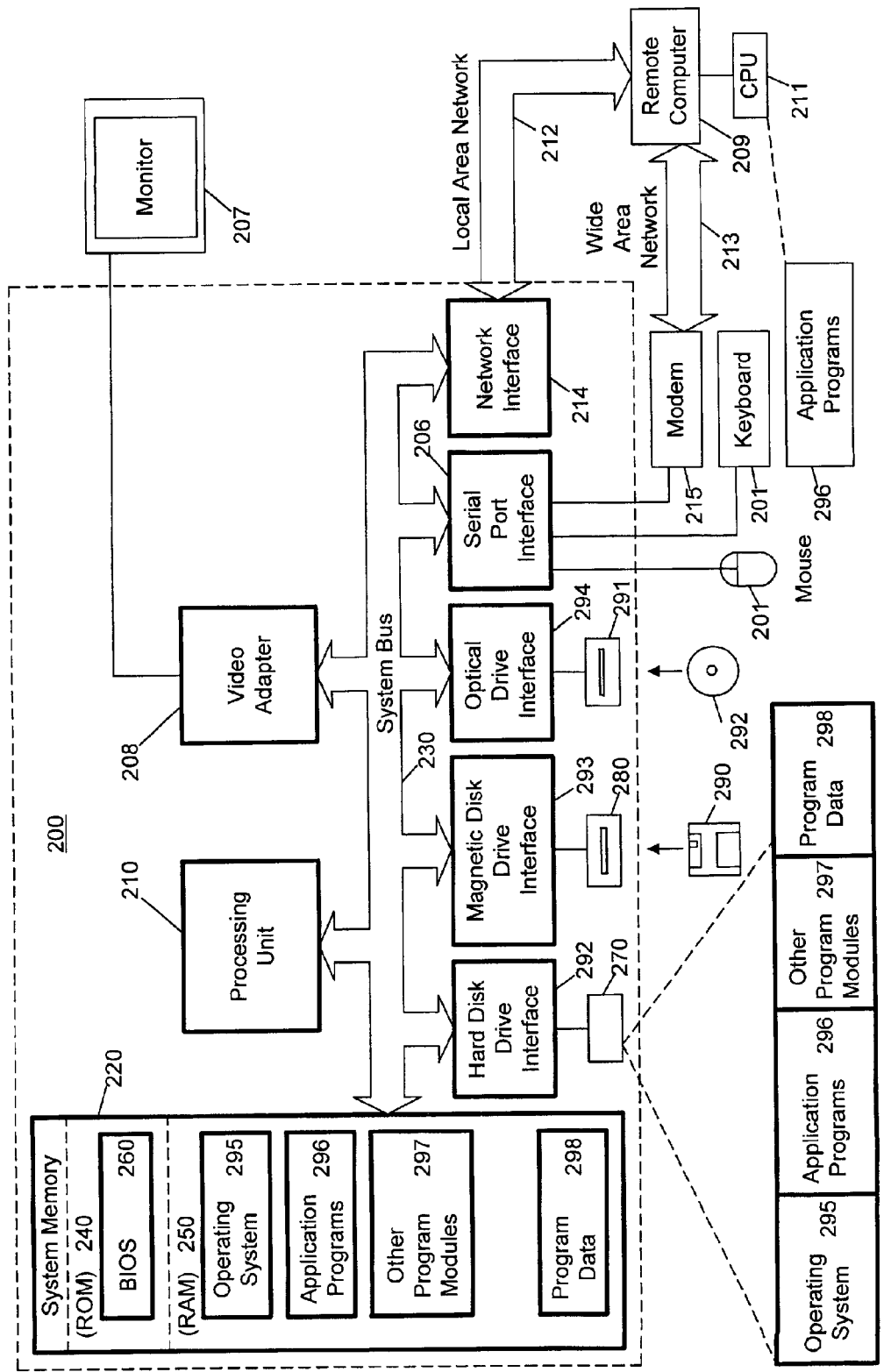
FIG. 1 shows a general purpose computer supporting the display and annotation of an electronic document in accordance with embodiments of the present invention.

FIG. 1 is a schematic diagram of a computing environment in which the present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system, bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 1. The logical connections depicted in FIG. 1 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

In addition to the system described in relation to FIG. 1, the invention may be practiced on a handheld computer. Further, purpose-built devices may support the invention as well. In short, handheld computers and purpose-built devices are similar in structure to the system of FIG. 1 but may be limited to a display (which may be touch-sensitive to a human finger or stylus), memory (including RAM and ROM), and a synchronization/modem port for connecting the handheld computer and purpose-built devices to another computer or a network (including the Internet) to download and/or upload documents or download and/or upload annotations. The description of handheld computers and purpose-built devices is known in the art and is omitted for simplicity. The invention may be practiced using C. Also, it is appreciated that other languages may be used including C++, assembly language, and the like.

Figure 2:
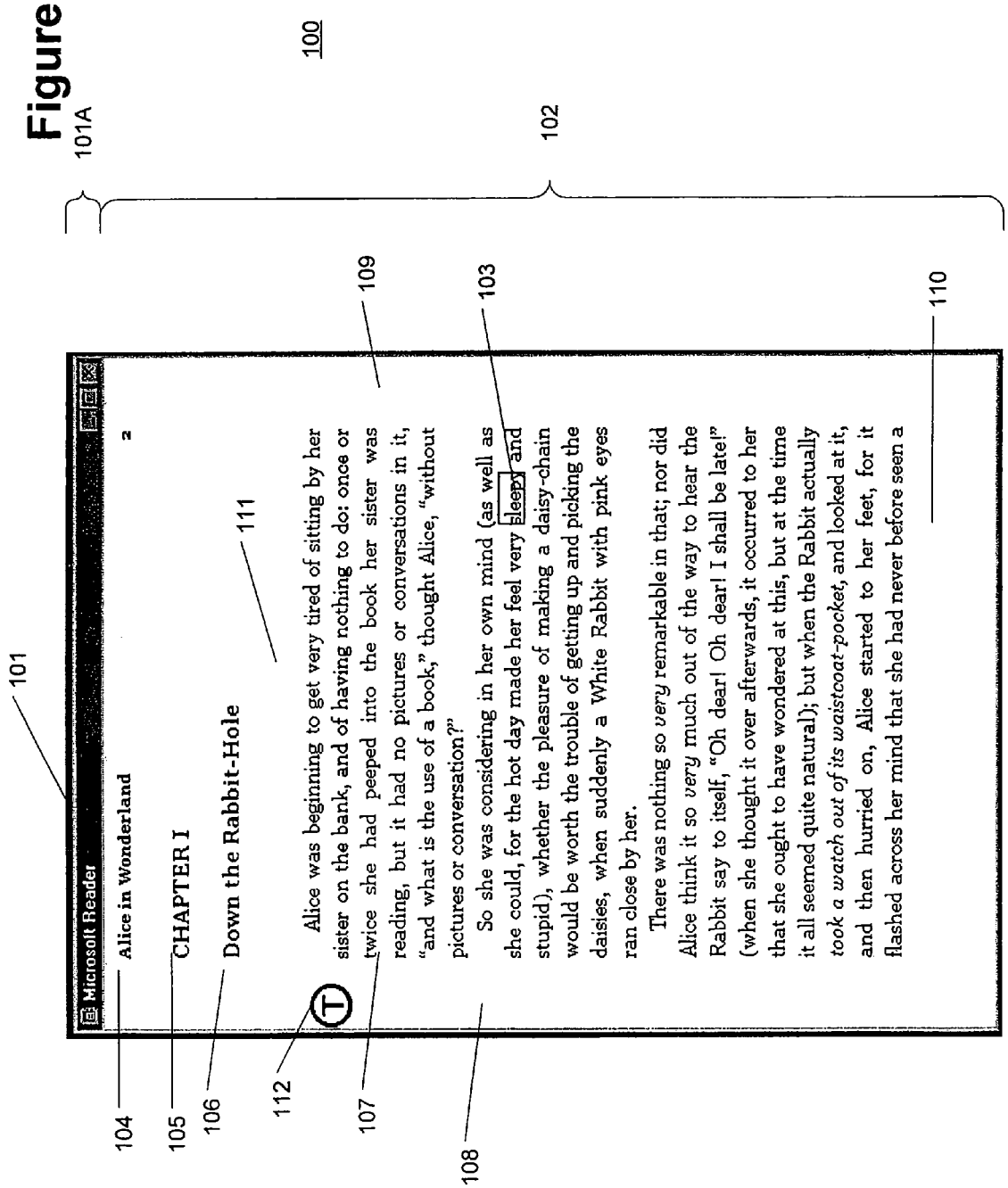
FIG. 2 shows a displayed document on a computer screen in accordance with embodiments of the present invention.

FIG. 2 shows a displayed document on a computer screen in accordance with embodiments of the present invention. As preferred, the document is displayed in a form that closely resembles the appearance of a paper equivalent of the e-book and, in this case, a paper novel. The document reader window 101 may comprise a variety of portions including a title bar 101A listing the title of the document and a body 102. In the body 102 of the display window, various portions of a document may be displayed. FIG. 2 shows an example where a title 104, a chapter number 105, a chapter title 106, and the text of the chapter 107 are displayed. Similar to an actual book, margins 108, 109, 110, and 111 appear around the displayed text. As referred to herein, the displayed elements may be independently referenced. Here, for example object 103 "sleepy" has a drawing annotation placing a box around it as placed there by the user. The presence of icon 112 indicates that a text annotation is present in the line of text adjacent to the icon 112. While the icon 112 is represented as the letter "T" in a circle, it will be appreciated by those of skill in the art that other representations may be used to designate the presence of an annotation. For example, other letters may be used (for instance, the letter "A" for annotation) or other symbols may be used (for instance, a symbol of an open book) or any other representation that indicate that an annotation exists. Tapping on (or otherwise activating) the icon (or other designation) results in the display of a stored annotation.

Figure 3:
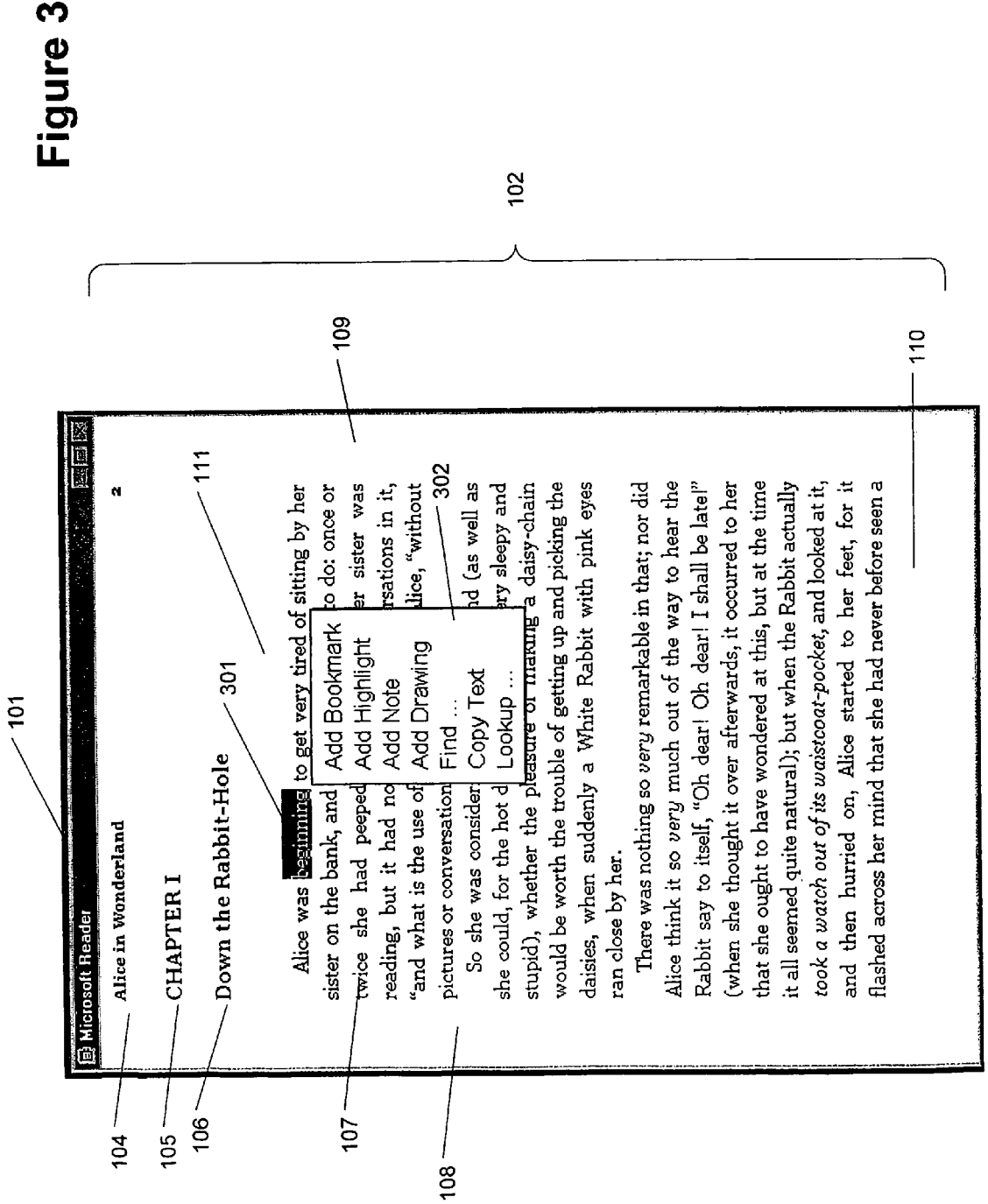
FIG. 3 shows a displayed document with an object selected in accordance with embodiments of the present invention.

FIG. 3 shows a displayed window after an object has been selected. Here, for example, the object "beginning" 301 in the first line of text 107 was selected. The object may be selected through tapping it with a stylus or a user's finger. Alternatively, a user may position a cursor over the object then select the object (by clicking a mouse button or by operating a designation source). As shown in FIG. 3, upon selection of the object, the object is shown as selected, meaning in this example, that the pixels that make up the object and surrounding pixels are inverted. Alternative embodiments include changing the color of the pixels surrounding the object or highlighting the object in some other way as is known in the art.

After an object has been selected, window 302 is displayed. Window 302 contains actions operable on the selected object. As represented in FIG. 3, the following options are displayed:

Add Bookmark

Add Highlight

Add Note

Add Drawing

Find . . .

Copy Text

Lookup . . .

Various aspects of the actions associated with these menu options are treated in greater detail in the following disclosures, U.S. Ser. No. 09/456,127, filed Dec. 7, 1999, (BW 03797.80027), entitled "Bookmarking and Placemarking a Displayed Document in a Computer System;"

U.S. Ser. No. 09/455,754, filed Dec. 7, 1999, (BW 03797.84619), entitled "Method and Apparatus for Installing and Using Reference Materials In Conjunction With Reading Electronic Content;"

U.S. Ser. No. 09/455,805, (BW 03797.78802), filed Dec. 7, 1999, entitled "System and Method for Annotating an Electronic Document Independently of Its Content;"

U.S. Ser. No. 09/455,806, (BW 03797.84617), filed Dec. 7, 1999, entitled "Method and Apparatus For Capturing and Rendering Annotations For Non-Modifiable Electronic Content."

which are incorporated herein by reference for any essential disclosure.

Alternatively, window 302 may also have other options including, for example, those that may affect the display of the content as well. For example, window 302 may include menu options that allow for switching from one book to another. An advantage of displaying more information to the user may include a net reduction in the number of navigation steps required to perform a process. For example, by providing a menu option to allow one to change which book is currently being displayed, a user may switch between books with a few navigational commands. However, the total options available to a user at any given time may be substantial. Due to the overcrowding of window 302, displaying all options decreases the intuitive nature of adding an annotation to a page.

As shown in FIG. 3, the number of options available to the user are limited. By providing a limited number of options, the menu quickly becomes tailored to the intention of the user. Also, the window 302 may be placed close to the selected object so as to minimize the distance needed to move a cursor or stylus to select one of the displayed menu items. By minimizing the actions displayed to the user, the desire to provide pure functionality to the user without cluttering the user's reading space is fulfilled.

Figure 4:
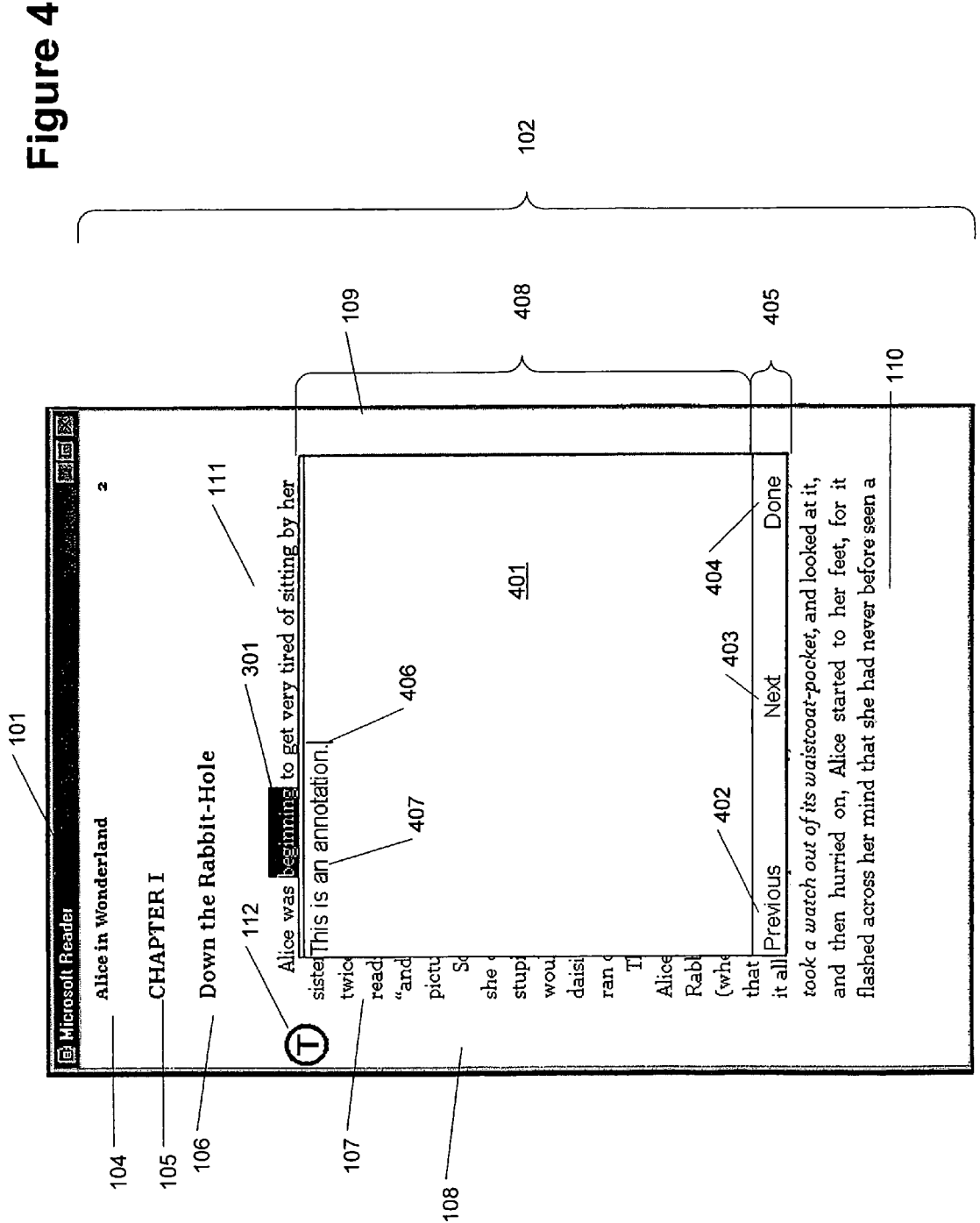
FIG. 4 shows a text annotation window in accordance with embodiments of the present invention.

FIG. 4 shows a display window 401 that accepts textual annotations. The display window 401 is generated in response to a selection of "Add Note" from FIG. 3. Window 401 includes a body portion 408 as well as a navigation portion 405. As shown in FIG. 4, the two portions are divided from each other. Alternatively, the navigation portion 405 may be integral with body portion 408. Body portion 408 includes text cursor 406, designating the location where new text will be entered. Also, body portion 408 includes previously entered text 407. To indicate that text has been entered, icon 112 is displayed juxtaposed to the line containing the selected object 301.

Navigation portion 405 may include, for example, navigation options 402 and 403 as well as an option to close window 408. When selected, navigation option 402 labeled "Previous" switches the displayed annotation to the previous annotation. Similarly, when selected, navigation option 403 labeled "Next" switches the displayed annotation to the next annotation.

To close window 401, the user may tap on close option (here, for example, entitled "Done") 404. Alternatively, the user may tap anywhere outside window 401 to close window 401. By allowing a user to select a portion of the display outside window 401, the user has indicated a preference that the user's interest now lies outside of window 401.

Figure 9:
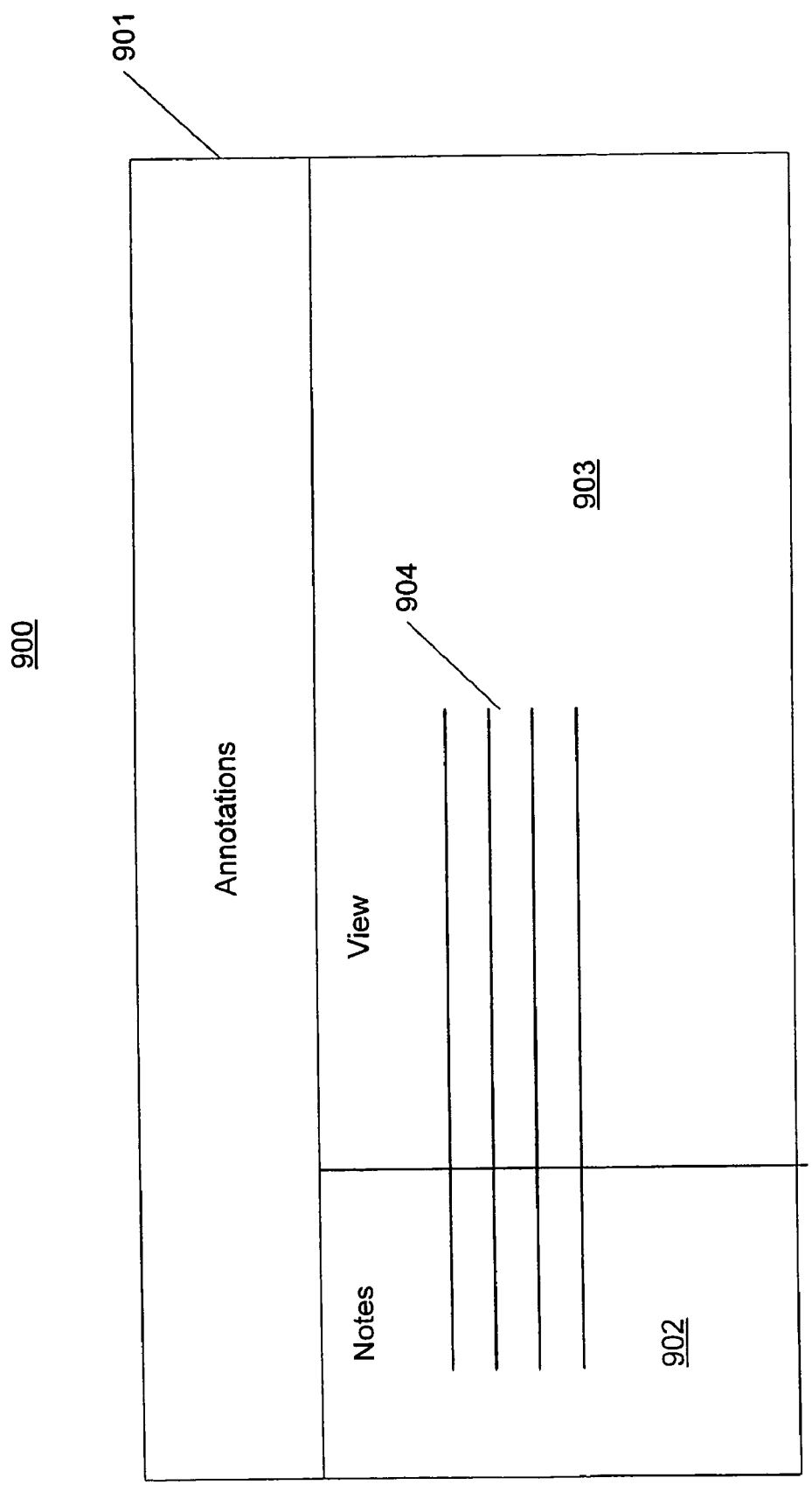
FIG. 9 shows a screen for manipulating annotations in accordance with embodiments of the present invention.

When a user navigates to another text annotation, the displayed content 107 of the book underlying window 401 may remain fixed at the location of the original text annotation 301. Alternatively, the displayed content 107 may follow the navigation to the next annotation. Using this second approach, if a user wanted to start reading at the location of the next annotation, the user may close window 401 through activation of close option (here, for example, entitled "Done") 404 or by activating (tapping, clicking, etc.) outside of window 401. The previous and next annotations may be the previous and next annotations as related to the book presently being viewed. In this regard, a list of annotations may be maintained. This list may be sorted as shown in FIG. 9. The ability to sort annotations allows a user then to reference the annotations through an alternative ordering method, alternative to file position location in the book.

In addition to being able to navigate annotations in the presently displayed book, navigation of annotations in other books may also be used. For example, a user may have annotated an object in one book. While reading a second book, the user may make a second annotation. Later, the user may want to compare the annotations while reading the second book. To accomplish this goal, the user would operate the previous 402 and next 403 options in navigation portion 405 to step from one annotation to the next until arriving at the desired annotation. Alternatively, users may use a Search capability to locate annotations on any number of books/documents from a centralized Annotations Index page. Users would accomplish that by typing the text they are searching for in sort/filter view anchored to the Annotations Index page and it would then return all occurrences of the said text across all annotations found.

Preferably, the display of windows 302 and 401 in response to user input is as fast as possible. This quick display furthers the paradigm of immediate response to user input (i.e., instant gratification). Alternatively, for stylistic reasons, the windows 302 and 401 may scroll down, unfurl, zoom in from a side of the screen, pop in, and appear via similar display techniques. An advantage of having a small delay in the display of a window allows for enhanced graphical displays. For example, an animated graphic may appear to highlight the action that is about to occur (e.g., a blue pane of a decorated white window may slide open indicating that a new window has been opened or is about to open). Despite whether a delay occurs or not in the opening of windows 302 and 401, the user is presented with a simple interface for authoring a text annotation and navigating among text annotations with ease.

In order to navigate from one text annotation to another, the system must know the location of the previous and next text notes and where these locations are as compared to the displayed page of the book. Fixing location of the textual annotation is accomplished by determining the file position of the displayed object.

Figure 5:
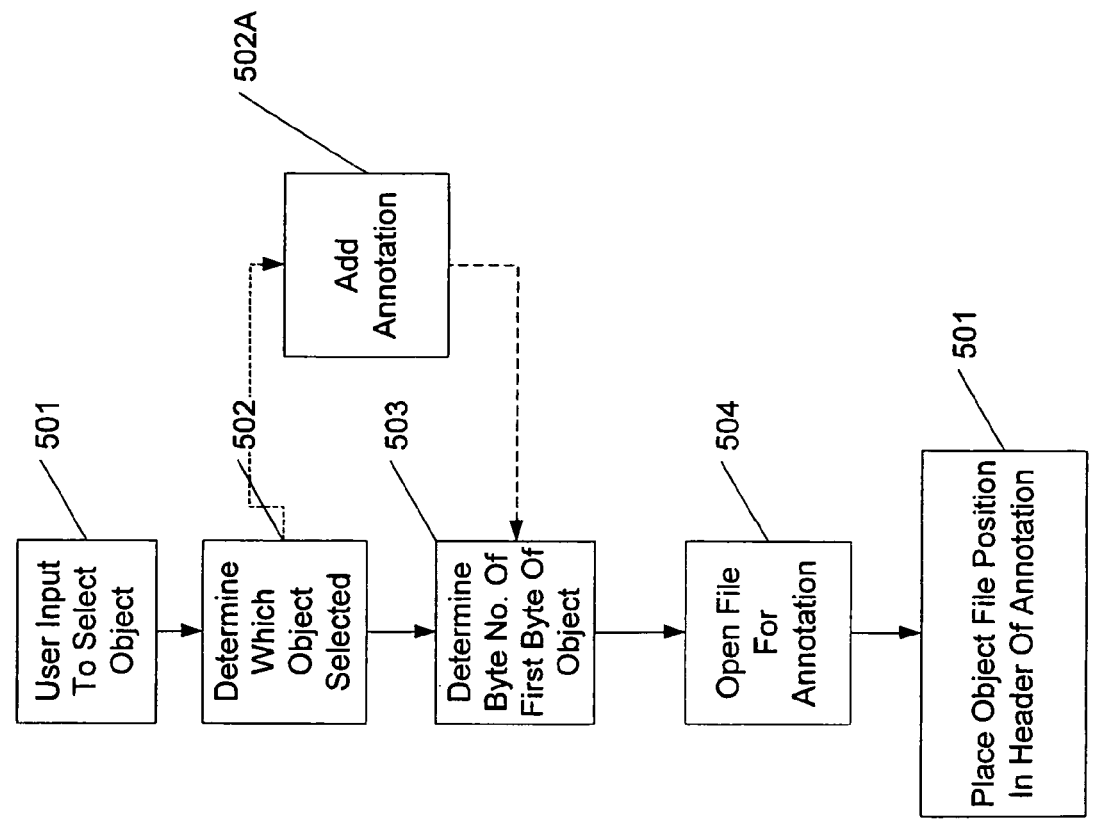
FIG. 5 shows a process for determining the file position of an object in accordance with embodiments of the present invention.

FIG. 5 shows a process for determining the file position of an object in accordance with embodiments of the present invention. In step 501, a user selects an object on the screen. The user may select the object via a cursor controlled through a mouse, touch-pad, trackball, or like pointing device. Alternatively, the user may use a stylus or finger if the surface of the display can accommodate such input.

In step 502, the system determines which object was selected by the user. This step relates to the conversion of the physical coordinates from the display device to coordinates inside the reader window. From this conversion, the object selected by the user is known.

Step 502A is optional. It relates to the user selection of an action post selection of the object. If the user is supplied with a menu after selection of the object and the function of adding an annotation is provided on the menu, step 502A relates to the selection of the adding the annotation function.

Step 503 relates to the determination of the file position of the selected object. The file position may include the first byte of the selected object. Alternatively, the file position may be the first byte of the last character (or even the character following the last character) of the selected object. Selecting the first byte of the first character to determine the file position provides the advantage of displaying any annotation on the page of the beginning of the object, rather then on the next page if the object spans a page. Anyone of skill in the art will appreciate that any byte of the selected object (or surrounding the selected object) may be selected to provide the file position of the object. Alternatively, one may select the line in which the object is located. Or, one may select a line having the object. Further, one may merely select the paragraph or portion of the page (top, middle, or bottom) that is to store the annotation.

The file position may be determined by counting the number of bytes from some known file position to the location of, for example, the first character of the selected object. The known file position may be the beginning of the file, or may be, for example, a previously noted file position for the beginning of the current paragraph. The counting step may be performed before or after generation of the annotation. Alternatively, the counting step may be performed in the background while the annotation is being created by the user.

Should the characters preceding the selected object be represented in the file by a variable-length character-encoding scheme like UTF-8, then the number of characters between the known file position and the selected object must be used to calculate a byte-offset between the known file position and the selected object. This byte-offset can then be added to the known file position to determine the file position of the selected object.

Step 504 relates to creating a file to persist the annotation. While shown after step 503, it will be appreciated that it may occur prior to or during the determination of the file position of the object. In step 504, the file position is placed in the header of the file (or portion of the file) storing the created annotation. Alternatively, the file position may be appended to the file being viewed.

Figure 6:
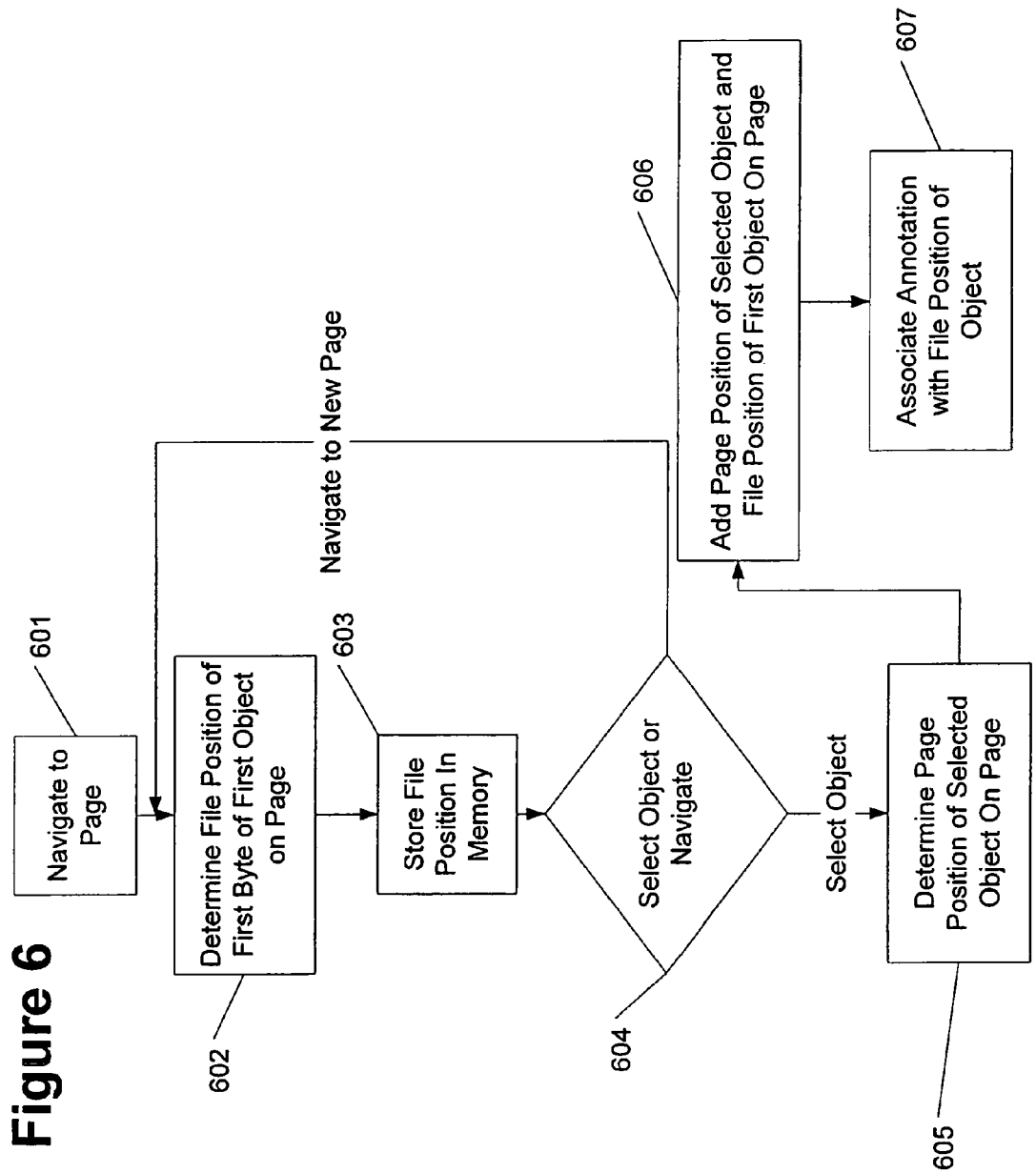
FIG. 6 shows another process for determining the file position of an object in accordance with embodiments of the present invention.

FIG. 6 shows another process for determining the file position of an object in accordance with embodiments of the present invention. FIG. 6 is different from FIG. 5 in that FIG. 6 attempts to pre-calculate a significant portion of the file position prior to receiving a selection of an object from the user. As shown in step 601, a user navigates to a page.

Once on the page, the system determines the file position of the first byte of the first object on the page as shown in step 602. The file position may be determined every time a new page is displayed. Alternatively, the system may pause (for example, two seconds) before starting to determine the file position for the first byte in order to allow the user to navigate to a new page before starting the file position determination. This delay provides the advantage of minimizing system workload when a user is quickly flipping pages. Once the user settles down with a given page, the system may then determine the file position of the first byte.

In step 603, the file position of the page is temporarily stored in memory.

In step 604, the system waits for either selection of an object or navigation to another page. More options are contemplated that do not need the file position for execution (for example, looking up a term in a reference document as disclosed in U.S. Ser. No. 09/455,754, filed Dec. 7, 1999, (BW 03797.84619), entitled "Method and Apparatus for Installing and Using Reference Materials In Conjunction With Reading Electronic Content;" whose contents are incorporated herein by reference in its entirety for any enabling disclosure).

In step 605, once an object is selected, the relative position of the selected object is determined with reference to the first byte of the first object on the displayed page.

In step 606, the file position of the first byte of the first object on the page as determined in step 602 is retrieved from memory (as stored in step 603) and added to the relative position of the first byte of the selected object as determined in step 605 to determine the file position of the selected object.

In step 607, the file position of the selected object is stored along with the created annotation. These steps relating to the determination of the file position may occur before or after the annotation for the object. Alternatively, the file position may be preformed in the background while the annotation is being created. Those skilled in the art will appreciate that any number of techniques may be used to determine object position and still be considered to be within the scope of the present invention.

Figure 7:
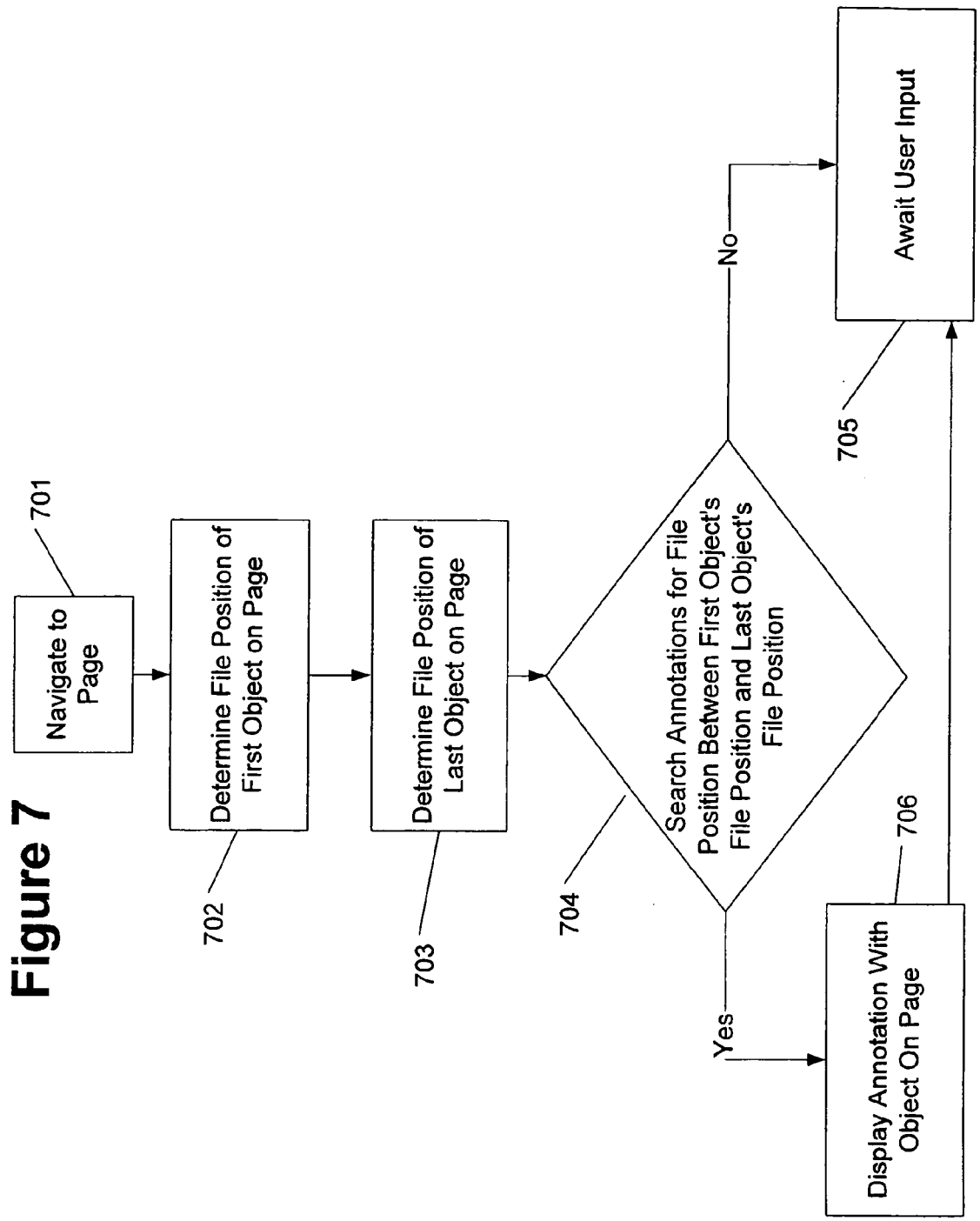
FIG. 7 shows a process for displaying annotations in accordance with embodiments of the present invention.

FIG. 7 relates to a process for displaying the created annotation when navigating to the page. In step 701, a user navigates to a page.

In step 702, the system determines the file position of the first object on the page.

In step 703, the system determines the file position of the last object on the page.

In step 704, the annotations stored for the document are searched to determine if any have file positions located between the file position determined in step 702 and the file position determined in step 703.

In step 705, if no annotations with a file position are located for display on the displayed page, the system waits for user input (including, for example, navigation to a new page or selection of an object for annotation, or any other action described herein).

In step 706, an annotation has been found that relates to an object on the page. The location of the object on the page is determined and the annotation is displayed for the object. The system for determining the location of the object may include subtracting the file position of the first object on the page from the file position of the annotated object. This difference is then used to determine how many bytes from the first character of the page is the annotated object.

Alternatively, the system may count again from the beginning of the document to determine which object has been annotated. It will be appreciated by those skilled in the art that that numerous methods exist for displaying the annotation for the annotated object. The above examples are not intended to be limiting.

In the context of displaying the annotations that are determined to exist in a given "page" of the content (the unit of text being viewed by the user at any given time), the computer system will first validate a global state, which determines whether annotations should be rendered at all. For example, the user is provided with the ability to globally specify whether to show or hide drawing annotations (as well as text notes, bookmarks, highlights, etc.). Prior to displaying a particular annotation of an object, the computer system will check this global setting to determine whether or not to render the specific annotation. If the user has chosen to hide annotations of that particular type, the annotation will not be rendered.

FIGS. 8A and 8B show various storage techniques for storing annotations in accordance with embodiments of the present invention. FIG. 8A shows a document 801 that has modifiable (803-806) and non-modifiable (802) portions. Files of this type include Infotext file formats as are known in the art. Annotations 806 may be stored in combination with the non-modifiable content 802. An annotation 806 may be stored in a file with header 803 and body 806. The header 803 includes, for example, the file position 804 of the object with which the annotation 806 is associated. It may also include an indication of the type of annotation 806 in file portion 805. As discussed above, the annotation 806 may include a highlight, a bookmark, a drawing to be overlaid over the object, or a text annotation.

FIG. 8B shows the non-modifiable content 809 as a separate file apart from the annotation file. The annotation file 807 of FIG. 8B has similar constituent elements to that of annotation 807 of FIG. 8A. Annotation file 807 may include a file portion 808 that indicates to which non-modifiable document (here, 809) it is linked. Using the approach set forth in FIG. 8B, one file may store all annotations for a user with the non-modifiable content portions 809 being stored separately. This approach has the advantage of being able to quickly scan all annotations at one time rather than accessing all documents 801 (as including non-modifiable portions 802) to obtain all annotations stored therein.

FIG. 9 shows a display window for sorting, modifying, searching, and renaming the annotations stored in a system. The window 900 includes a title identifier 901 to alert the user that he or she is in an annotation pane 900. The window 900 may include two panes 902 and 903 (other panes may be added as needed). Panes 902 and 903 may provide a listing of annotations 904 by document. Alternatively, they may provide a listing of all annotations in a person's system. When in pane 902 (here, entitled "Notes"), the user may sort the list of annotations by type (highlight, drawing, text, bookmark). Selecting an annotation allows one to navigate to the location in the document containing the annotation. Selecting and holding the annotation allows one to remove, change the appearance of, hide or show that particular annotation, or rename the annotation. The second pane 903 (here, entitled "View") may allow a user to sort annotations based on their properties. For example, one may sort on the time created, time last accessed, by type, alphabetically, and on book order.

In the foregoing specification, the present invention has been described with reference to specific exemplary embodiments thereof. Although the invention has been described in terms of various embodiments, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

We claim:

1. A computer system for annotating a system having a display for displaying a non-modifiable page of a document having objects comprising:
    means for receiving an indication that an object in the page of the document is to be annotated;
    means for providing a window for each annotation to a user having a portion for receiving an annotation of the object, said window having a portion allowing navigation to at least one other annotation window containing an annotation of at least one other object means for navigating directly to said at least one other annotation window to the annotation of said at least one other object; and
    means for closing said window upon receiving user input not associated with said window.

2. The computer system according to claim 1, said means for receiving comprising:
    means for receiving a selection of the object; and
    means for receiving a selection of a menu item that provides said window, said portion of said window for receiving the annotation of the object.

3. The computer system according to claim 1, further comprising:
    means for receiving a user input; and
    means for displaying said at least one other annotation in said window.

4. The computer system according to claim 3, further comprising:
    means for maintaining the display of the non-modifiable page irrespective of the display of said at least one other annotation in said window.

5. The computer system according to claim 3, further comprising:
    means for displaying another non-modifiable page in response to said display of said at least one other annotation in said window.

6. The computer system according to claim 5, wherein said window overlies said another non-modifiable page.

7. The computer system according to claim 1, further comprising:
    means for displaying an indication that a text annotation has been stored in conjunction with an object on said non-modifiable page.

8. The computer system according to claim 1, further comprising:
    means for receiving an annotation of the object;
    means for determining a position of the object in the document; and
    means for storing the position and the annotation of the object separately from the non-modifiable portion of the document.

9. The computer system according to claim 8, wherein the designation of the object is received through interaction with a stylus.

10. The computer system according to claim 8, wherein the designation of the object is received through interaction with a mouse.

11. The computer system according to claim 8, wherein said means for determining comprises:
    means for counting the bytes from the beginning of the non-modifiable portion of the document to the annotated object.

12. The computer system according to claim 8, wherein said means for determining comprises:
    means for counting the number of bytes from the beginning of the non-modifiable portion of the document to a first object on the displayed page;
    means for counting the number of bytes from the first object on the displayed page to the annotated object; and
    means for adding the number obtained from said first means for counting to the number obtained from said second means for counting to determine the file position of the annotated object in said file.

13. A computer system for a user to annotate objects of a non-modifiable page of a document displayed on a display in a system, comprising:
    means for receiving an indication from a user that an object in the displayed page of the document is to be annotated;
    means for providing a window for each annotation to a user wherein a portion of said window allows the user to enter an annotation to be associated with the object, and wherein a portion of said window allows the user to directly navigate to at least one of the previous and next annotation windows, each having an annotation of another object of said document; and
    means for closing said window upon receiving user input not associated with said window.

14. The computer system according to claim 13, said means for receiving further comprising:
- means for receiving a selection of the object; and
- means for receiving a selection of a menu item that provides said window, said portion of said window for receiving the annotation of the object.

15. The computer system according to claim 13, further comprising:
- means for receiving a user input; and
- means for displaying said at least one other annotation in said window.

16. The computer system according to claim 15, further comprising:
- means for maintaining the display of the non-modifiable page irrespective of the display of said at least one other annotation in said window.

17. The computer system according to claim 15, further comprising:
- means for displaying another non-modifiable page in response to said display of said at least one other annotation in said window.

18. The computer system according to claim 17, wherein said window overlies said another non-modifiable page.

19. The computer system according to claim 13, further comprising:
- means for displaying an indication that a text annotation has been stored in conjunction with an object on said non-modifiable page.

20. The computer system according to claim 13, further comprising:
- means for receiving an annotation of the object;
- means for determining a position of the object in the document; and
- means for storing the position and the annotation of the object separately from the non-modifiable portion of the document.

21. The computer system according to claim 20, wherein the designation of the object is received through interaction with a stylus.

22. The computer system according to claim 20, wherein the designation of the object is received through interaction with a mouse.

23. The computer system according to claim 20, wherein said means for determining comprises:
- means for counting the bytes from the beginning of the non-modifiable portion of the document to the annotated object.

24. The computer system according to claim 20, wherein said means for determining comprises:
- means for counting the number of bytes from the beginning of the non-modifiable portion of the document to a first object on the displayed page;
- means for counting the number of bytes from the first object on the displayed page to the annotated object; and
- means for adding the number obtained from said first counting step to the number obtained from said second counting step to determine the file position of the annotated object in said file.

* * * * *